Sept. 2, 1958  J. GARDINER ET AL  2,849,861
AIRCRAFT REACTION PROPULSION UNITS AND INSTALLATIONS
WITH MEANS TO PRODUCE REVERSE THRUST
Filed Jan. 19, 1954
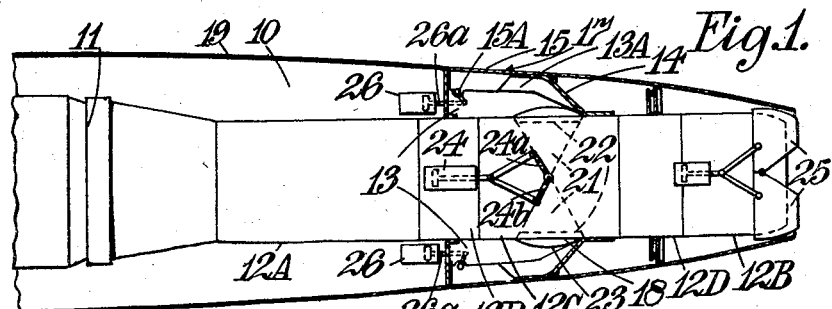
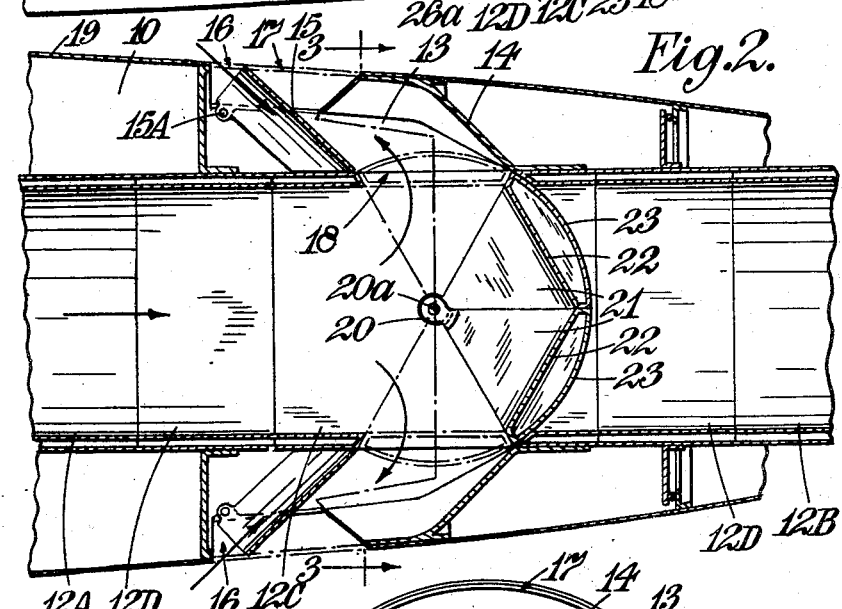
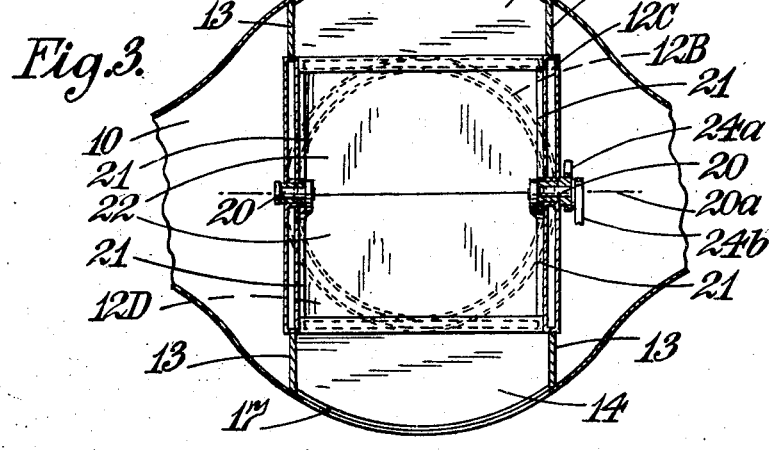

United States Patent Office 2,849,861
Patented Sept. 2, 1958

2,849,861

AIRCRAFT REACTION PROPULSION UNITS AND INSTALLATIONS WITH MEANS TO PRODUCE REVERSE THRUST

John Gardiner, Chaddesden, and John Stanley Wallett, Allestree, England, assignors to Rolls-Royce Limited, Derby, England, a British company Application January 19, 1954, Serial No. 404,925

Claims priority, application Great Britain January 22, 1953

6 Claims. (Cl. 60—35.54)

This invention relates to aircraft reaction-propulsion units and installations in which a stream of gas flowing through a jet pipe passes from the jet-pipe to atmosphere through a propulsion nozzle thereby providing propulsive thrust; such units and installations may comprise for instance a gas turbine engine to provide by its exhaust the stream of gas to pass through the propulsion nozzle.

Difficulties have arisen in operation of aircraft having such reaction-propulsion units, more particularly in landing of the aircraft fitted with such units, because there is little braking effect on the aircraft due to the low aerodynamic drag of installations embodying such reaction-propulsion units, and also due to the existence of a residual thrust from the propulsion unit even when the unit is operating at its minimum power. As a result, a more extensive landing space may be required for an aircraft fitted with such reaction-propulsion units than for a conventional propeller-driven aircraft in which a braking effect is normally provided by the propellers when the aircraft is landing, and which may be fitted with reversible-pitch propellers.

It is the primary object of the present invention to provide an aircraft reaction propulsion unit or installation in which such difficulties are reduced.

According to the present invention an aircraft reaction propulsion unit or installation comprises a jet-pipe, a propulsion nozzle at the outlet end of the jet-pipe, porting in the wall of the jet-pipe upstream of the propulsion nozzle leading to auxiliary ducting extending from the porting in a direction inclined forwardly to the direction of flight to an outlet to atmosphere so that gas flowing through the auxiliary ducting produces a breaking effect on an aircraft fitted with the unit, and at least one valve member adapted to swing about an axis at right angles to the jet-pipe axis and passing through it and adapted in one position to close off the passage through said auxiliary ducting and in a second position to block the flow through the jet pipe to the propulsion nozzle. With this arrangement, with the valve member in the second position, the gas stream passes to atmosphere with a substantial component of velocity upstream relative to the direction of flight and so a substantial braking effect is produced on the aircraft.

Preferably the auxiliary ducting comprises at least two separate passages; for example in the case of an aircraft reaction propulsion unit of the kind comprising a gas turbine engine installed in a wing of the aircraft, the auxiliary ducting may comprise two passages leading from the porting in the jet-pipe to outlets in the upper and lower wing surfaces, and in this case there will be two valve members which in their second positions extend each across half of the jet-pipe passage so as together to block it. When the gas turbine engine is installed in the fuselage or a nacelle of the aircraft, the outlets will be formed in the fuselage or nacelle surface.

The adoption of the invention avoids the necessity to provide separate valve members for controlling the gas flow through the auxiliary ducting from the jet pipe and for blocking off the gas flow through the jet pipe to the propulsion nozzle.

The valve members may conveniently comprise pivoted elements having surfaces which are adapted in the first position to present a smooth continuation of the wall of the jet pipe and are adapted, when the valve members are in the second position, to assist in deflecting the gas stream from the jet-pipe into the auxiliary ducting.

According to a feature of the invention, there may be provided at the outlet or outlets of the auxiliary ducting one or more flap members adapted to close off the outlets when the valve member or members are in the first position, and to uncover the outlets when the valve member or members are moved into the second position.

One embodiment of the invention will now be described with reference to the accompanying drawings in which:

Figure 1 illustrates a gas-turbine engine with a jet pipe installed in a nacelle in an aircraft wing;

Figure 2 is a diagrammatic axial section of part of the jet pipe installation; and Figure 3 is a cross-sectional view on the line 3—3 of Figure 2.

Referring to the drawings, an engine nacelle structure is shown at 10, and it accommodates a gas turbine engine 11 from which the exhaust gas passes into a jet pipe of which an upstream portion is shown at 12A and a downstream portion at 12B. The jet pipe portions 12A and 12B are circular in cross-section and between these portions, there is a further portion 12C whereof the cross-section is substantially square as more clearly shown in Figure 3. The jet pipe portions 12A and 12B are connected to the portion 12C through portions 12D whereof the cross-section changes gradually from circular adjacent the portions 12A, 12B to square adjacent the portion 12C. The jet-pipe portion 12B has at its outlet a propulsion-nozzle 25, shown as a variable-area nozzle.

The jet-pipe portion 12C has ports 18 formed in its upper and lower surfaces, and there are provided side walls 13 which extend outwards from the jet-pipe portion 12C to apertures 17 in the skin 19 of the nacelle 10. There are also forwardly and outwardly curved end walls 14 which project from the downstream edges of the ports 18, and also pivoted flap members 15 located forwardly of the ports 18. The walls 14 and flap members 15 extend from one side wall 13 to the other.

The flap members 15 are of substantially rectangular plan form and are pivoted on axes 15A to be movable from a position in which they close the apertures 17 in the skin 19 of the engine nacelle to a position, shown in Figures 2 and 3, in which they constitute a wall of the auxiliary ducting. The gaps 16 forward of the leading edge of the flap members 15, when the latter are in the second position, provide for a flow of cooling air from atmosphere into the nacelle. The flap members 15 are actuated by rams 26 through linkages 26a.

There are also provided valve members to co-operate with the apertures 18, and the valve members are pivotally mounted in trunnion bearings 20 to pivot about an axis 20a, which is at right angles to the jet pipe axis and intersects it. Each valve member comprises plane side plates 21, each shaped as a sector of a circle, and interconnecting the side plates 21, an inner wall 22 of plane form and an outer wall 23 of part-cylindrical form. The valve members are movable by a ram 24 through levers 24a, 24b connected with the trunnion shafts of the valve members, between the position shown in dotted lines (Figure 2) in which they close off the ports 18 and the position shown in full lines in which the ports 18 are uncovered.

The valve members, when in the first position, afford by their inner walls 22 smooth continuations of the upper and lower walls of the portion 12C of the jet pipe and the exhaust gas stream flowing in the jet pipe from the turbine engine 11 passes to atmosphere through the normal propelling nozzle 25 at the downstream end of the jet pipe. In this position also the valve members cut off the communication between the jet pipe and the auxiliary ducting formed by the walls 13, 14 and flaps 15. When the valve members are in this position, the flap members 15 are moved to the position closing off the apertures 17 in the skin 19 of the nacelle.

In the second position of the valve members (shown in full lines in Figure 2), the path of the exhaust gas stream through the jet pipe is blocked, but the jet pipe is in communication with the auxiliary ducting between the ports 18 and apertures 17, and the flap members 15 are pivoted to the positions shown. In this position, the inner walls 22 of the valve members assist to deflect the exhaust gas stream from the jet pipe and, with the curved walls 14 which are substantially continuations of the walls 22, assist substantially to reverse the direction of exhaust gas flow, so that on passing to atmosphere it has a substantial component of velocity upstream relative to the direction of flight. Thus a substantial braking effect will be produced on the aircraft.

Since the valve members are substantially symmetrical about a plane through their pivotal axes, the resultant of the gas loads on the members acts along a line through the pivotal axis so that the loads required to cause pivoting of the valve members are low.

In the arrangement described, rams 24, 26, levers 24a, 24b and links 26a are shown for actuating the control members and flaps 15 but any other suitable form of actuating mechanism or linkage, or both, may be used, for example, they may be operated by an electric motor operating through a reduction gear. The movements of the valve members and of the flap members 15 may be correlated to give any desired sequence of operations.

We claim:

1. An aircraft reaction propulsion unit or installation comprising a jet-pipe having a duct-defining wall, a propulsion nozzle at the outlet end of the jet-pipe, porting in the wall of the jet-pipe upstream of the propulsion nozzle, a fairing skin around said jet pipe and spaced therefrom, an aperture in said skin at a position forwards of said porting, auxiliary ducting means communicating with the jet pipe through said porting, being inclined in a direction forwardly to the direction of flight, and extending from the porting to said aperture thereby to open to atmosphere so that gas flowing through the auxiliary ducting produces a braking effect on an aircraft fitted with the unit, and at least one valve member adapted to swing about an axis which is at right angles to the jet-pipe axis and passes through it, said valve member being adapted in one position to close off the entrance to said auxiliary ducting from said jet pipe and in a second position to block the flow through the jet-pipe to the propulsion nozzle.

2. An aircraft reaction propulsion unit or installation as claimed in claim 1, wherein said jet-pipe comprises a portion of square cross-section, which portion has the porting formed therein, and wherein each valve member comprises a pair of side plates each shaped as a sector of a circle and an inner wall of plane form and an outer wall of part-cylindrical form, said inner wall and said outer wall each interconnecting said side plates, and said inner wall in the first position of the valve member forming a smooth continuation of the wall of the square section portion of the jet-pipe.

3. An aircraft reaction-propulsion unit or installation comprising a jet pipe having a duct-defining wall, a propulsion nozzle at the outlet end of said jet pipe, porting in upper and lower parts of the jet pipe at a position upstream of said propulsion nozzle, a fairing skin around said jet pipe and spaced therefrom, said fairing skin having upper and lower surface portions, there being apertures in said upper and lower surface portions at positions forwards of the porting in the upper part of the jet pipe wall and the porting in the lower part of the jet pipe wall respectively, auxiliary ducting means affording a pair of passages, the one passage extending upwardly and forwardly from the porting in the upper part of the jet pipe wall to the aperture in the upper portion of the fairing skin and the other passage extending downwardly and forwardly from the porting in the lower part of the jet pipe wall to the aperture in the lower surface portion of the fairing skin, whereby said auxiliary ducting passages communicate with the jet pipe and with atmosphere and gas flowing through said passages from the jet pipe to atmosphere produces a braking effect on an aircraft fitted with the unit, a pair of valve members mounted to swing each about an axis which is at right angles to the axis of the jet pipe and passes through the axis of the jet pipe, said valve members being adapted in one position to close off the entrance to said passages through the porting and in a second position being arranged to extend each across half of the flow path through the jet pipe and together to block said flow path to the propulsion nozzle.

4. An aircraft reaction-propulsion unit or installation as claimed in claim 3, wherein said jet pipe is of square cross section in the region of said upper and lower parts of the jet pipe wall and wherein each valve member comprises a pair of side plates, each shaped as a sector of a circle, and an inner wall of plane form and an outer wall of part-cylindrical form, said inner and outer walls each interconnecting said side plates and said inner wall in the first position of the valve member forming a smooth continuation of the wall of the square cross section portion of the jet pipe.

5. An aircraft reaction propulsion unit or installation comprising a jet pipe having a duct-defining wall, a propulsion nozzle at the outlet end of the jet pipe, porting in the wall of the jet pipe upstream of the propulsion nozzle, a fairing skin around said jet pipe and spaced therefrom, a pair of apertures in said skin at a position forwards of said porting, a pair of auxiliary duct communicating with the jet pipe through said porting, being inclined in a direction forwardly to the direction of flight, and extending from the porting to said apertures thereby to open to atmosphere so that gas flowing through the auxiliary ducting produces a braking effect on an aircraft fitted with the unit, and a pair of valve members each of which is adapted to swing about an axis extending substantially through the jet pipe axis at right angles thereto, said valve members being adapted in one position fully to close off the entrances to said auxiliary ducting from said jet pipe and in a second position to block the flow through the jet-pipe to the propulsion nozzle, adjacent edges of the members co-operating in said second position to form a continuous surface blocking the flow.

6. An aircraft jet-propulsion installation comprising a jet pipe having a duct-defining wall, a propulsion nozzle at the outlet end of the jet pipe, a pair of ports in the wall of the jet pipe upstream of the propulsion nozzle, said ports being positioned at opposite sides of the jet pipe axis relative to each other, said jet pipe being square in cross-section in the region of said ports; a fairing skin around said jet pipe and spaced therefrom, a pair of apertures being formed in said skin at a position forward of said ports, each aperture being associated with a respective one of said ports; wall means affording a pair of auxiliary ducts which communicate with the jet pipe through the ports, extend forwardly from the ports and communicate with atmosphere through the apertures so that gas flowing through the auxiliary ducts produces a braking effect on an aircraft having the installation; a valve member associated with each respective port, each said valve member comprising a pair of sector-shaped side plates, and an inner wall of plane form and an outer wall of part-cylindrical form, said inner and outer walls each interconnecting said side plates, said valve members being mounted to swing about an axis extending substantially through the jet pipe axis at right angles thereto between a first position in which they close off their respective associated ports, said inner wall forming a smooth continuation of the square cross-section portion of the jet pipe to permit an unobstructed flow of working fluid to the propulsion nozzle, and a second position in which they permit the working fluid to flow through said ports and auxiliary ducts, adjacent edges of the members co-operating in said second position to form a continuous surface blocking the flow through the jet pipe to the propulsion nozzle; and a part of the wall of each auxiliary duct being movable to close off the corresponding aperture and form part of the fairing skin when the valve members are in said first position.

References Cited in the file of this patent

UNITED STATES PATENTS

| | | |
|---|---|---|
| 543,182 | Hunt | July 23, 1895 |
| 1,237,364 | Miller | Aug. 21, 1917 |
| 1,652,054 | Schlagenhauff | Dec. 6, 1927 |
| 2,418,488 | Thompson | Apr. 8, 1947 |
| 2,568,813 | Lundberg | Sept. 25, 1951 |
| 2,620,622 | Lundberg | Dec. 9, 1952 |
| 2,637,164 | Robson et al. | May 5, 1953 |
| 2,657,881 | Douglas | Nov. 3, 1953 |
| 2,680,948 | Greene | June 15, 1954 |
| 2,681,548 | Kappus | June 22, 1954 |
| 2,735,264 | Jewett | Feb. 21, 1956 |

FOREIGN PATENTS

| | | |
|---|---|---|
| 9,435 | Great Britain | of 1908 |